United States Patent [19]

Kosako

[11] Patent Number: 5,194,340

[45] Date of Patent: Mar. 16, 1993

[54] POLARIZED BATTERY TERMINAL CONTACT DEVICE

[75] Inventor: Kosei Kosako, Tokyo, Japan

[73] Assignee: Asahi Kogaku Kogyo Kabushiki Kaisha, Tokyo, Japan

[21] Appl. No.: 771,401

[22] Filed: Oct. 2, 1991

[30] Foreign Application Priority Data

Oct. 5, 1990 [JP] Japan .............. 2-104983[U]

[51] Int. Cl.$^5$ .................. H01M 2/00; H01M 2/10
[52] U.S. Cl. .......................... 429/1; 429/96; 429/100; 429/121
[58] Field of Search ............. 429/1, 121, 100, 96, 429/99; 439/831

[56] References Cited

U.S. PATENT DOCUMENTS

| | | | |
|---|---|---|---|
| 3,887,393 | 6/1975 | La Rue, Jr. ............. | 429/99 |
| 3,984,257 | 10/1976 | Zurcher .................. | 429/1 |
| 4,468,439 | 8/1984 | Ohara et al. ............ | 429/1 |
| 4,595,641 | 6/1986 | Giurtino .................. | 429/1 |
| 4,737,420 | 4/1988 | Ikeda et al. ............. | 429/1 |

FOREIGN PATENT DOCUMENTS 2072438  9/1991  United Kingdom ............... 429/1

Primary Examiner—John S. Maples
Attorney, Agent, or Firm—Kane, Dalsimer, Sullivan, Kurucz, Levy, Eisele and Richard

[57] ABSTRACT

A contact device including a cylindrical battery which has a circular terminal and a projecting terminal at opposite ends, the projecting terminal having a diameter smaller than that of the circular terminal and having a polarity opposite that of the circular terminal. A battery receptacle has a pair of electrodes to which the respective terminals of the battery are connected when the battery is loaded in the battery receptacle, and a malconnection prevention projection which permits one of the electrodes of the battery receptacle to be electrically connected to the circular terminal of the battery and prevents the one electrode of the battery receptacle from being electrically connected to the projecting terminal of the battery.

38 Claims, 6 Drawing Sheets

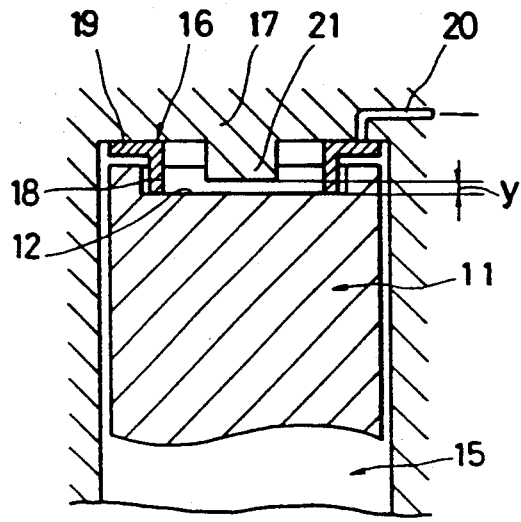
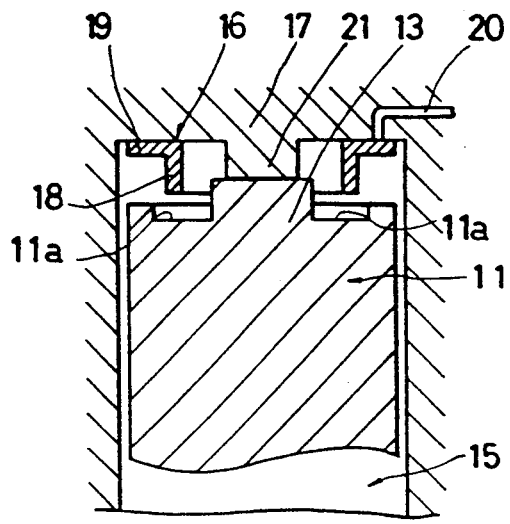
Fig. 1A
Fig. 1B
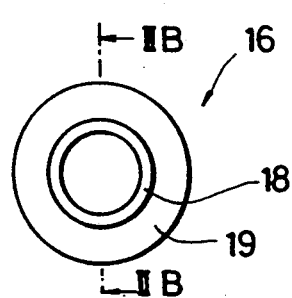
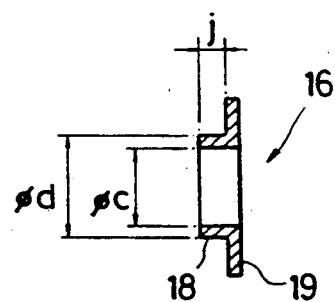
Fig. 2A
Fig. 2B

5,194,340

POLARIZED BATTERY TERMINAL CONTACT DEVICE

BACKGROUND OF THE INVENTION

1. Field of the Invention

The present invention relates to a contact device in which an electrical connection is not established when a battery is placed in a battery receiving chamber in the wrong direction.

2. Description of Related Art

Generally speaking, upon loading a dry battery in a battery receiving chamber in electrical appliances, such as a portable radio, using a dry battery or batteries, attention must be paid to the following points.

Firstly, the positive (+) terminal (male terminal) and the negative (−) terminal (circular or female terminal) of the battery loaded in the battery receiving chamber (battery receptacle) must correspond to the positive contact and the negative contact of the battery receiving chamber.

Secondly, an electrical connection between the battery terminals and the corresponding contacts of the battery receiving chamber must be accurately established.

If the battery is loaded in the battery receiving chamber in the wrong (opposite) direction, so that the positive and negative terminals of the battery are connected to the negative and positive contacts of the battery receiving chamber, respectively, the electric current is sent in the opposite direction in the electric circuit of the associated electric equipment, resulting in damage of the electric circuit or, in the worst case, the circuit may break due to overheating.

SUMMARY OF THE INVENTION

The primary object of the present invention is to provide a contact device in which the electrical power of the battery can be supplied to the electric circuit only when the battery is loaded in the battery loading chamber in the correct polar direction.

To achieve the object mentioned above, according to the present invention, there is provided a contact device including a pillar battery which has a circular terminal and a projecting terminal at opposite ends. The projecting terminal has a smaller diameter than that of the circular terminal and a different polarity. The contact device also includes a battery receptacle which has a pair of electrodes to which the respective terminals of the battery are connected when the battery is loaded in the battery receptacle. The improvement of the present invention is comprised of a means for permitting one of the electrodes of the battery receptacle to be electrically connected only to the circular terminal of the battery thereby preventing said one electrode of the battery receptacle from being electrically connected to the projecting terminal of the battery.

The means comprises a raised electrode which constitutes said one electrode of the battery receptacle.

With this arrangement, if the battery is loaded in the opposite polar direction in the battery receptacle (battery receiving chamber), the projecting terminal of the battery can not be brought into contact with the raised electrode of the battery receptacle. Consequently, an electrical connection is not established between the battery and the battery receptacle, so that damage or breakage of the electrical circuit does not occur due to the inverted flow of electric current.

Preferably, the raised electrode is located on a portion of the battery receptacle corresponding to a difference between the diameter of the circular terminal and the diameter of the projecting terminal as viewed in the axial direction of the battery.

Preferably, provision is made for a base plate secured to the inner wall of the battery receptacle that is opposed to the circular terminal of the battery. The raised electrode can be integrally formed with the base plate.

Preferably, a malconnection prevention projection is provided on the battery receptacle to come into contact with the projecting terminal of the battery. The malconnection prevention projection has a height shorter than that of the raised electrode. The malconnection prevention projection can be made of an electrical insulation material.

According to another aspect of the present invention, the following are relationships between an outer diameter $\phi a$ of the projecting terminal of the battery and the diameter $\phi c$ of a first circle which contacts the inner wall of the raised electrode and is concentric to the battery, the inner diameter $\phi b$ of the circular terminal of the battery and the diameter $\phi d$ of a second circle which contacts the outer wall of the raised electrode and is concentric to the battery, the depth i including zero of the circular terminal of the battery and the effective height j of the raised electrode, and the height x of the projecting terminal of the battery and the difference y between the effective height j of the raised electrode and the height of the malconnection prevention projection;

$$\phi a < \phi c,\ \phi d - \phi b,\ i < j,\ y < x$$

The raised electrode is, for example, in the form of an annular projection projecting from the base plate. The malconnection prevention projection is located within the raised annular electrode.

Alternatively, the raised electrode can be in the form of a single plate or a pair of plates projecting from the base plate at one side or opposite sides thereof.

The raised electrode can be formed by partially cutting and bending the base plate.

The malconnection prevention projection preferably projects through an opening which is defined by the cut-away portion of the base plate.

The raised electrode can be in the form of a rectangular ring. The malconnection prevention projection is located within the rectangular ring of the raised electrode.

The present disclosure relates to subject matter contained in Japanese utility model application No. 2-104983 (filed on Oct. 5, 1990) which is expressly incorporated herein by reference in its entirety.

BRIEF DESCRIPTION OF THE DRAWINGS

The invention will be described below in detail with reference to the accompanying drawings, in which;

FIG. 1A is a sectional view of a negative (−) contact having a raised annular electrode of a battery receptacle and a negative terminal of a battery connected thereto;

FIG. 1B is a sectional view of a negative (−) contact having a raised annular electrode of a battery receptacle and a positive terminal of a battery;

FIG. 2A is a bottom view of FIG. 1A, showing a negative contact having a raised annular electrode of a battery receptacle;

FIG. 2B is a sectional view taken along the line IIB—11B in FIG. 2A;

DESCRIPTION OF PREFERRED EMBODIMENTS

FIGS. 1A through 3B show a first embodiment of the present invention.

Figure 3A:
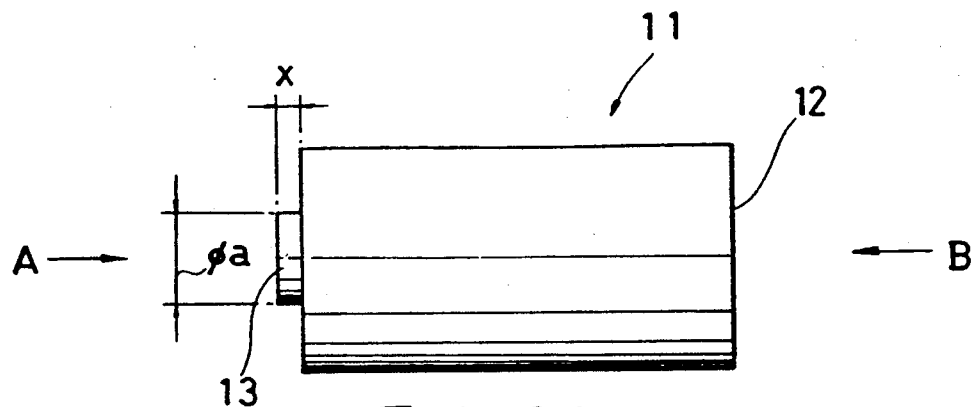
FIG. 3A is a side elevational view of a battery.
Figure 3B:
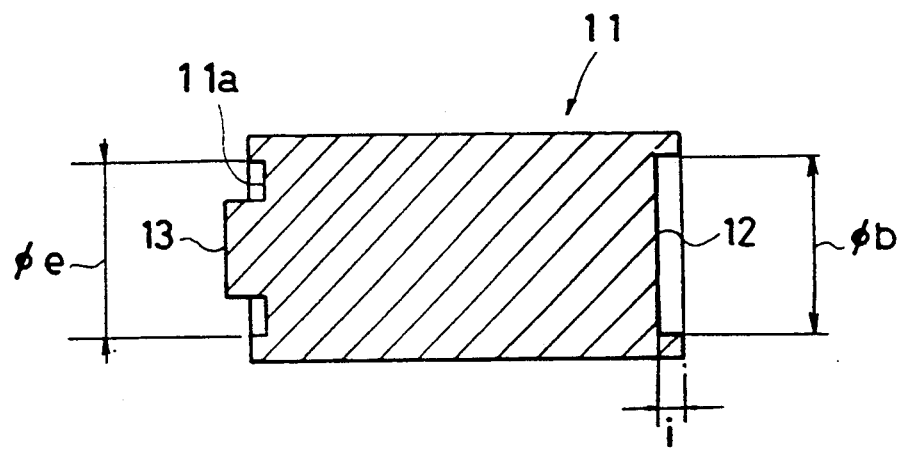
FIG. 3B is a longitudinal sectional view of a battery shown in FIG. 3A.
Figures 4A, 4B:
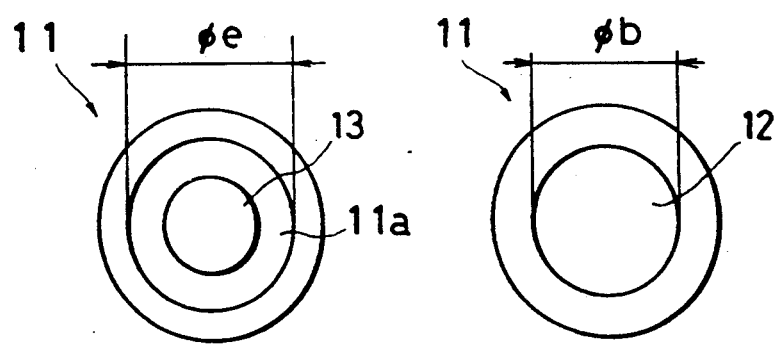
FIG. 4A is a left end view of a battery, viewed from the direction A shown in FIG. 3A.
FIG. 4B is a right end view of a battery, viewed from the direction B shown in FIG. 3A.
Figure 5A:
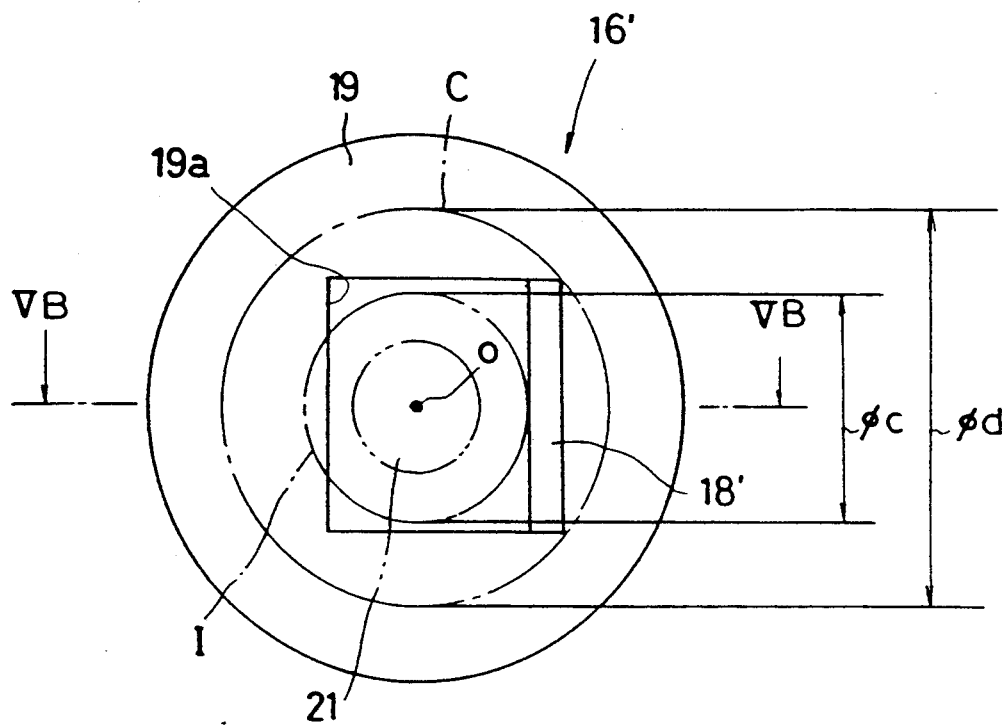
FIG. 5A is a view of a negative contact of a battery receptacle having a raised planar electrode.
Figure 5B:
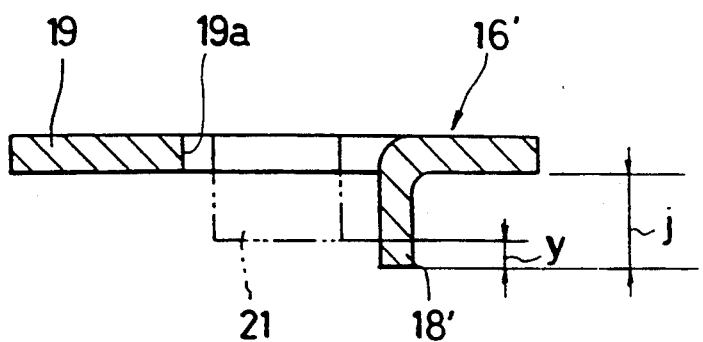
FIG. 5B is a partial sectional view taken along the line VB—VB in FIG. 5A.
Figure 6A:
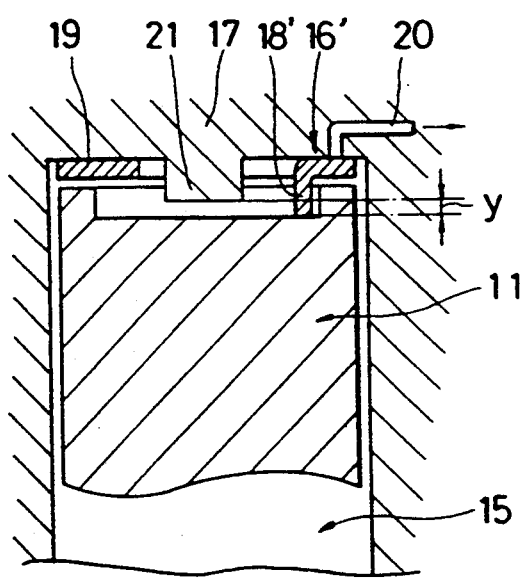
FIG. 6A is a sectional view of a negative contact having a raised planar electrode of a battery receptacle and a negative terminal of a battery.
Figure 6B:
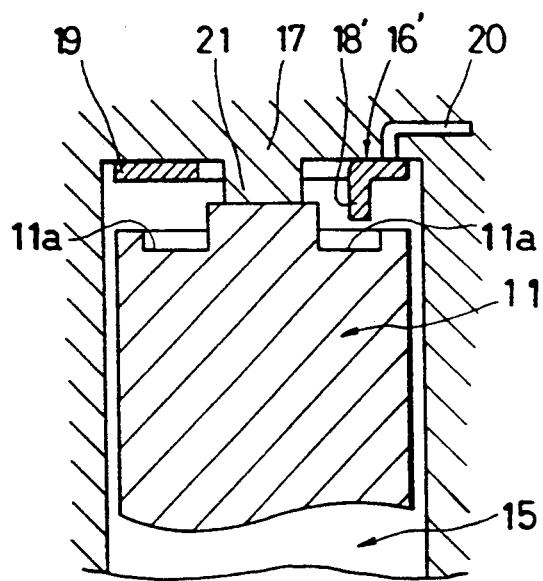
FIG. 6B is a sectional view of a negative contact having a raised planar electrode of a battery receptacle and a positive terminal of a battery.

A solid cylindrical battery 11 has at its opposite ends a circular negative terminal (circular or recessed terminal) 12 and a positive terminal (projecting terminal) 13 which has a diameter $\phi a$ smaller than the inner diameter $\phi b$ of the negative terminal 12, respectively. The positive terminal 13 of the battery 11 is electrically connected to the annular portion 11a surrounding the positive terminal 13, as can be seen in FIGS. 3B and 4A. The outer circumference of annular portion 11a has a diameter $\phi e$ identical to the inner diameter $\phi b$ of the negative terminal 12.

A battery receiving chamber (battery receptacle) 15 of an electrical appliance, such as a portable radio is cylindrical having a diameter substantially identical to the diameter of the battery 11 to be loaded therein. The battery receptacle 15 is provided on its one end with a positive contact (not shown), and on the other end with negative contact 16. When the battery 11 is loaded in the battery receptacle 15, the battery is depressed against the negative contact 16 of the battery receptacle 15 by a spring (not shown) located at the positive contact thereof.

The negative contact 16 has a base plate 19 secured to an inner wall of an insulation portion 17 of the battery receptacle 15. The base plate 19 is provided on its center portion with a raised electrode 18 in the form of an annular projection. The base plate 19 is electrically connected to a circuit (not shown) through a conductor 20 embedded in the insulation portion 17. The insulation portion 17 of the battery receptacle 15 has a malconnection prevention projection 21 which projects from the insulation portion 17 at the center of the raised annular electrode 18 to prevent the positive terminal 13 of the battery 11 from being connected to the negative contact 16 of the battery receptacle 15.

The following are relationships between the outer diameter $\phi a$ of the positive terminal 13 of the battery 11 and the inner diameter $\phi c$ of the raised annular electrode 18, the inner diameter $\phi b$ of the negative terminal 12 of the battery 11 and the outer diameter $\phi d$ of the raised annular electrode 18, the depth i (FIG. 3B) of the negative terminal 12 of the battery 11 and the effective height j (FIG. 2B) of the raised annular electrode 18 from the plane of the base plate 19, and the height x (FIG. 3A) of the positive terminal 13 of the battery 11 and the difference y (FIG. 1A) between the effective height j of the raised electrode 18 and the height of the malconnection prevention projection 21:

$$\phi a < \phi c, \phi d < \phi b, i < j, y < x$$

Note that the depth i of the negative terminal 12 can be zero ("0") in the above-mentioned inequality of $i<j$, since the negative terminal 12 which is in the form of a recess in the illustrated embodiment can be defined by a wholly flat end surface of the battery 11.

When the battery 11 is correctly loaded in the battery receptacle 15, as shown in FIG. 1A, the raised annular electrode 18 of the battery receptacle 15 is located in the peripheral end projection of the battery 11 which defines the recessed negative terminal 12 of the battery 11 due to the above-mentioned inequality of $\phi d < \phi b$. Namely, the projecting end of the raised electrode 18 comes into contact with the surface of the negative terminal 12. In this state, since the malconnection prevention projection 21 is shorter than the height of the raised electrode 18 by the value y, the malconnection prevention projection 21 does not contact the negative terminal 12. Consequently, the projecting front end of the raised electrode 18 is accurately connected to the negative terminal 12.

If the battery 11 is loaded in the battery receptacle 15 in the opposite polar direction wherein the positive terminal 13 and the negative terminal 12 are inverted, as shown in FIG. 1B, the positive terminal 13 of the battery 11 enters the raised electrode 18 of the battery receptacle 15 and comes into contact with the malconnection prevention projection 21. The malconnection prevention projection 21 which is made of insulation material prevents not only the positive terminal 13 from being connected to the conductor 20, but also the surrounding portion 11a of the positive terminal 13 from being connected to the raised electrode 18 (and the conductor 20).

Thus, even if the battery 11 is inversely loaded in the battery receptacle 15, an electrical connection between the battery and the battery receptacle is prevented, and accordingly, neither damage nor breakage of the circuit due to a malconnection takes place.

FIGS. 5A through 6B show a second embodiment of the present invention. In the second embodiment, the electrode 18 of the annular projection in the first embodiment is replaced with an electrode 18' which is in the form of a rectangular plate projection which is formed by partially cutting and bending the base plate 19 at the center thereof. The malconnection prevention projection 21 projects through an opening 19a which is formed by the cut-away portion of the base plate 19.

The raised electrode 18' is located between a circle I, which contacts the inner wall surface of the raised electrode 18' and is concentric to the cylindrical battery 11, and a circle C which contacts the outer wall of the raised electrode 18' and is concentric to the cylindrical battery 11. The diameters of the circles I and C are identical to the inner diameter $\phi c$ and the outer diameter $\phi d$ of the raised annular electrode 18 in the first embodiment, respectively.

The raised electrode 18' is secured to the insulation portion 17 so that the malconnection prevention projection 21 can be located closer to the center point O of the battery 11 than the raised electrode 18'. The effective height j of the raised electrode 18' and the difference y between the effective height of the raised electrode 18' and the height of the malconnection prevention projection 21 are identical to those in the first embodiment.

The negative contact 16' of the battery receptacle in the second embodiment, as constructed above, operates and achieves the technical effects, similar to the first embodiment.

Figure 7A:
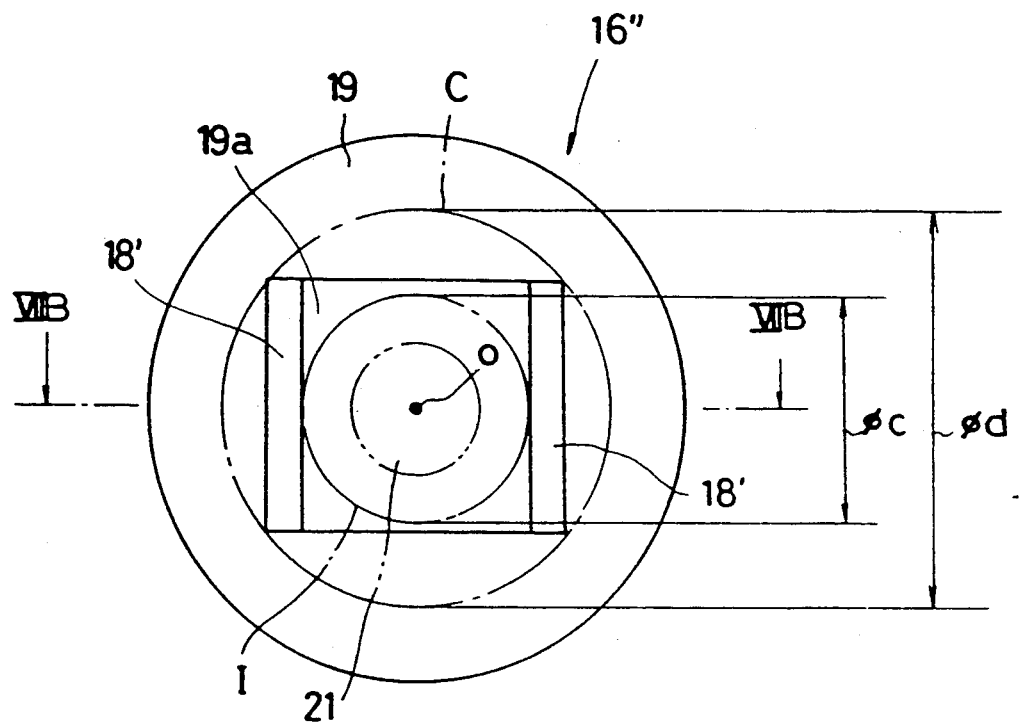
FIG. 7A is a view showing a negative contact having right and left raised planar electrodes of a battery receptacle on opposite sides of a base plate.
Figure 7B:
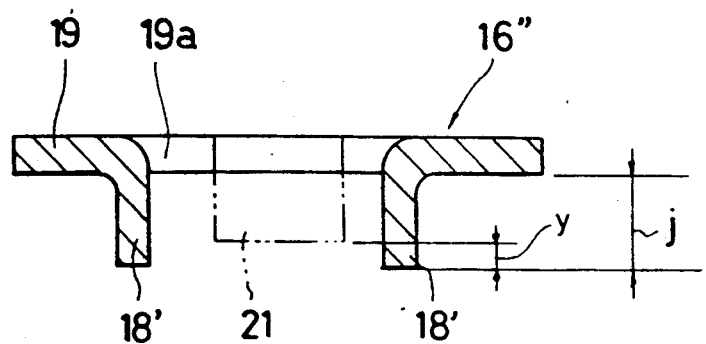
FIG. 7B is a sectional view taken along the line VIIB—VIIB in FIG. 7A.

FIGS. 7A and 7B show a modified negative contact 16" of the battery receptacle according to a third embodiment of the invention in which a pair of right and left electrodes 18', each being identical to the raised electrode 18' in the second embodiment illustrated in FIGS. 5A through 6B, are provided on opposite sides of the center O of the battery 11. The electrodes 18' are formed by partially cutting and bending the base plate 19, similar to FIG. 5B. The malconnection prevention projection 21 projects through an opening 19a defined by the cut-away portion of the base plate 19, similar to the second embodiment.

In the arrangement of FIGS. 7A and 7B, the diameters of the circle I, which contacts the inner walls of the right and left raised electrodes 18' and is concentric to the center O of the battery 11, and the circle C, which contacts the outer walls of the two raised electrodes 18' and is concentric to the center O of the battery 11, are identical to the inner diameter $\phi c$ and the outer diameter $\phi d$ of the raised annular electrode 18 in the first embodiment, respectively. Furthermore, the effective height j of the raised electrode 18' and the difference y between the effective height of the raised electrode 18' and the height of the malconnection prevention projection 21 are identical to those in the first embodiment, so that the negative contact 16" of the battery receptacle in the third embodiment operates and achieves technical effects similar to the first and second embodiments.

Figure 8A:
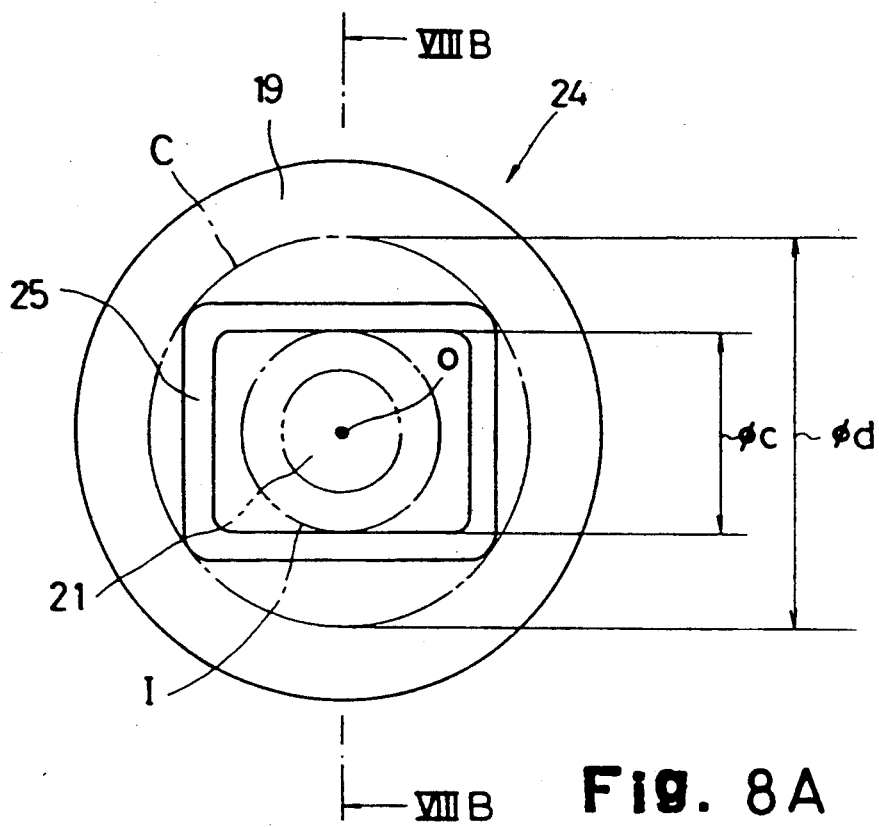
FIG. 8A is a view showing a negative contact having a substantially rectangular shaped raised electrode of a battery receptacle; and, FIG. 8B is a sectional view taken along the line VIIIB—VIIIB in FIG. 8A.
Figure 8B:
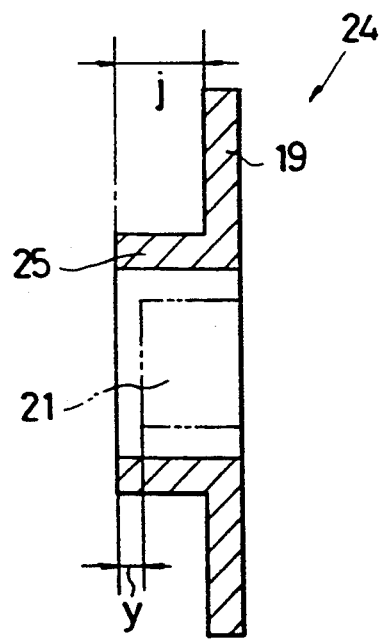

FIGS. 8A and 8B show a fourth embodiment of a negative contact 24 of the battery receptacle in which the raised annular electrode 18 of the first embodiment which is in the form of a circular ring is replaced with a raised annular electrode 25 which is in the form of a rectangular ring. In this modification, the diameters of the circle I which contacts the inner wall of the raised electrodes 25 and is concentric to the center O of the battery 11 and the circumscribed circle C which contacts the outer wall of the raised electrodes 25 and is concentric to the center O of the battery 11 are identical to the inner diameter $\phi c$ and the outer diameter $\phi d$ of the raised annular electrode 18 in the first embodiment, respectively. Furthermore, the effective height j of the raised electrode 25 is identical to that of the first embodiment, so that the negative contact 24 of the battery receptacle in the fourth embodiment operates and achieves technical effects similar to the first, second and third embodiments.

As mentioned above, although the malconnection prevention projection 21 is located within the circle I which contacts the inner wall of the annular electrode 18 or 18' in the first, second, third and fourth embodiment, to achieve the object of the present invention the raised electrode(s) 18 or 18' which can be electrically connected only to the negative terminal 12 of the battery 11 and can not be electrically connected to the positive terminal 13 of the battery 11 alone would be sufficient. Consequently, another type of battery in which the positive terminal 13 is electrically insulated from the outer peripheral portion 11a, the malconnection prevention projection 21 can be dispensed with, as can be seen from FIGS. 1B and 6B. Namely, if there is no malconnection prevention projection 21, the raised electrode 18 or 18' comes into contact with the outer peripheral portion 11a of the battery 11, but no electrical connection is established between the battery and the raised electrode 18 or 18' of the battery receptacle, since the outer peripheral portion 11a of the battery 11 is electrically insulated from the positive electrode 13.

Although the invention has been described with reference to particular means, materials and embodiments, it is to be understood that the invention is not limited to the particulars disclosed and extends to all equivalents within the scope of the claims.

I claim:

1. In a contact device including a cylindrical battery having a recessed circular terminal and a projecting terminal centered on opposite end faces, the projecting terminal having a diameter smaller than that of the circular terminal and having a polarity opposite to that of the circular terminal, and a battery receptacle having a pair of electrodes to which the respective terminals of the battery are connected when the battery is loaded in the battery receptacle the improvement comprising a raised portion of one of said electrodes of the battery receptacle providing means for permitting said one of the electrodes of the battery receptacle to be electrically connected only to the recessed circular terminal of the battery and for preventing said one electrode of the battery receptacle from being electrically connected to the projecting terminal of the battery.

2. A contact device according to claim 1, wherein said battery has opposed end faces and said circular terminal of the battery is defined by a flat surface of one of the end faces of the battery.

3. A contact device according to claim 1, wherein said raised portion of said one electrode is disposed within an annular section of said one electrode, said annular section corresponding to a difference between the diameter of the circular terminal and the diameter of the projecting terminal of the battery.

4. A contact device according to claim 3, further comprising a base plate secured to an inner wall of the battery receptacle opposite to the circular terminal of the battery.

5. A contact device according to claim 4, wherein said raised electrode is integrally formed with the base plate.

6. A contact device according to claim 5, further comprising prevention means for preventing a malconnection of the terminals of the battery to the electrodes of the battery receptacle.

7. A contact device according to claim 6, wherein said prevention means comprises a malconnection prevention projection provided on the battery receptacle to come into contact with the projecting terminal of the battery.

8. A contact device according to claim 7, wherein said malconnection prevention projection has a height shorter than that of the raised electrode.

9. A contact device according to claim 8, wherein said malconnection prevention projection is made of an electrically insulated material.

10. A contact device according to claim 8, wherein the following are relationships between the outer diameter $\phi a$ of the projecting terminal of the battery and the diameter $\phi c$ of a first circle which contacts the inner wall of the raised electrode and is concentric to the battery, the inner diameter $\phi b$ of the circular terminal of the battery and a diameter $\phi d$ of a second circle which contacts with the outer wall of the raised electrode and is concentric with the battery, the depth i, including a depth of zero, of the circular terminal of the battery and the effective height j of the raised electrode, and the height x of the projecting terminal of the battery and the difference y between the effective height j of the raised electrode and the height of the malconnection prevention projection;

$$\phi a < \phi c, \phi d < \phi b, i<j, y<x.$$

11. A contact device according to claim 7, wherein said raised electrode is in the form of an annular projection projecting from the base plate.

12. A contact device according to claim 11, wherein said malconnection prevention projection is located within the raised annular electrode.

13. A contact device according to claim 7, wherein said raised electrode is in the form of a single plate projecting from the base plate at one side thereof.

14. A contact device according to claim 13, wherein said raised electrode in the form of a single plate is formed by partially cutting and bending the base plate.

15. A contact device according to claim 14, wherein said malconnection prevention projection projects through an opening defined by a cut-away portion of the base plate.

16. A contact device according to claim 7, wherein said raised electrode is made of a pair of plates which are provided on opposite sides of the base plate.

17. A contact device according to claim 16, wherein said pair of plates of the raised electrode are formed by partially cutting and bending the base plate.

18. A contact device according to claim 17, wherein said malconnection prevention projection projects through an opening which is defined by a cut-away portion of the base plate.

19. A contact device according to claim 17, wherein said raised electrode is in the form of a rectangular ring.

20. A contact device according to claim 19, wherein said malconnection prevention projection is located within the rectangular ring of the raised electrode.

21. A contact device for a cylindrical battery, said battery having at its opposite ends a cylindrical recess containing therein a terminal and a cylindrically projecting terminal, said cylindrically projecting terminal having a diameter smaller than the diameter of the cylindrical recess, said device comprising: a pair of opposed contact portions, one of said contact portions comprising a raised electrode to which the terminal within the cylindrical recess of the battery is to be connected and the other of said contact portions including a malconnection prevention projection, said projection being more centrally located on its contact portion than the raised electrode and shorter than the raised electrode whereby said malconnection prevention projection cannot make contact with a battery terminal within said recess but can make contact with said battery projecting terminal.

22. A contact device according to claim 21, further comprising a battery receptacle in which the battery can be loaded so that said contact portion with the raised electrode is provided on the battery receptacle.

23. A contact device according to claim 22, further comprising a base plate secured to a portion of the battery receptacle that is opposite the recessed terminal of the battery to be connected.

24. A contact device according to claim 23, wherein said raised electrode is integrally formed with the base plate.

25. A contact device according to claim 24, wherein said malconnection prevention projection is provided on a portion of the battery receptacle that is opposite the projecting terminal of the battery to be connected thereto.

26. A contact device according to claim 25, wherein said malconnection prevention projection is made of an electrical insulation material.

27. A contact device according to claim 25, wherein said malconnection prevention projection has a height smaller than that of the raised electrode.

28. A contact device according to claim 22, wherein the following are relationships between the outer diameter $\phi a$ of the projecting terminal of the battery and the diameter $\phi c$ of a first circle which contacts the inner wall of the raised electrode and is concentric to the battery, the inner diameter $\phi b$ of the recessed terminal of the battery and the diameter $\phi d$ of a second circle which contacts with the outer wall of the raised electrode and is concentric to the battery, the depth i of the recessed terminal of the battery and the effective height j of the raised electrode, and the height x of the projecting terminal of the battery and the difference y between the effective height j of the raised electrode and the height of the malconnection prevention projection;

$$\phi a < \phi c, \phi d < \phi b, i<j, y<x.$$

29. A contact device according to claim 23, wherein said raised electrode is in the form of an annular projection projecting from the base plate.

30. A contact device according to claim 29, wherein said malconnection prevention projection is located within the raised annular electrode.

31. A contact device according to claim 30, wherein said raised electrode is in the form of a single plate projecting from the base plate at one side thereof.

32. A contact device according to claim 31, wherein said single plate is formed by partially cutting and bending the base plate.

33. A contact device according to claim 32, wherein said malconnection prevention projection projects through an opening which is defined by a cut-away portion of the base plate.

34. A contact device according to claim 30, wherein said raised electrode is made of a pair of plates which are provided on opposite sides of the base plate.

35. A contact device according to claim 34, wherein said pair of plates of the raised electrode are formed by partially cutting and bending the base plate.

36. A contact device according to claim 35, wherein said malconnection prevention projection projects through an opening which is defined by a cut-away portion of the base plate.

37. A contact device according to claim 30, wherein said raised electrode is in the form of a rectangular ring.

38. A contact device according to claim 37, wherein said malconnection prevention projection is located within the rectangular ring of the raised electrode.

* * * * *